United States Patent
Fukuhata et al.

(10) Patent No.: US 9,342,014 B2
(45) Date of Patent: May 17, 2016

(54) BELT DEVICE, FIXING DEVICE, AND IMAGE FORMING APPARATUS

(71) Applicants: Yoshihiro Fukuhata, Hyogo (JP); Yuusuke Furuichi, Kanagawa (JP)

(72) Inventors: Yoshihiro Fukuhata, Hyogo (JP); Yuusuke Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/806,555

(22) Filed: Jul. 22, 2015

(65) Prior Publication Data

US 2016/0033911 A1  Feb. 4, 2016

(30) Foreign Application Priority Data

Jul. 29, 2014  (JP) ................. 2014-153708

(51) Int. Cl.
*G03G 15/20* (2006.01)
*B65H 5/02* (2006.01)
*F16C 27/02* (2006.01)

(52) U.S. Cl.
CPC ............ *G03G 15/2085* (2013.01); *B65H 5/025* (2013.01); *F16C 27/02* (2013.01); *G03G 15/2017* (2013.01)

(58) Field of Classification Search
CPC ................... G03G 15/2017; G03G 2215/20
See application file for complete search history.

(56) References Cited

U.S. PATENT DOCUMENTS

| | | | | |
|---|---|---|---|---|
| 3,600,086 A | * | 8/1971 | Cates | G03G 15/30 101/132 |
| 2004/0170456 A1 | * | 9/2004 | Choi | G03G 15/602 399/367 |
| 2006/0193656 A1 | * | 8/2006 | Kumazawa | G03G 21/1647 399/121 |
| 2007/0223976 A1 | | 9/2007 | Yagi et al. | |
| 2008/0013992 A1 | | 1/2008 | Fukuhata et al. | |
| 2008/0013993 A1 | | 1/2008 | Obata et al. | |
| 2008/0031664 A1 | | 2/2008 | Yagi et al. | |
| 2008/0063442 A1 | | 3/2008 | Yagi et al. | |
| 2008/0069611 A1 | | 3/2008 | Obata et al. | |
| 2010/0178089 A1 | | 7/2010 | Fukuhata | |
| 2010/0239297 A1 | | 9/2010 | Sakaya et al. | |
| 2010/0260524 A1 | | 10/2010 | Hiraoka et al. | |

(Continued)

FOREIGN PATENT DOCUMENTS

| JP | 8-119484 | 5/1996 |
|---|---|---|
| JP | 2004-286932 | 10/2004 |

(Continued)

OTHER PUBLICATIONS

U.S. Appl. No. 14/587,273, filed Dec. 31, 2014.

*Primary Examiner* — Clayton E Laballe
*Assistant Examiner* — Victor Verbitsky
(74) *Attorney, Agent, or Firm* — Duft Bornsen & Fettig LLP

(57) ABSTRACT

A belt device includes a support and a support roller that support a belt. A driven gear is mounted on one of a plurality of shafts of the support roller. A driving gear meshing with the driven gear at a mesh position transmits a driving force to the support roller through the driven gear to rotate the support roller. An elastic bearing rotatably bearing each of the plurality of shafts of the support roller has an inner diameter smaller than an outer diameter of the shaft of the support roller. The bearing includes a slit defining a part of the bearing in a circumferential direction thereof. The slit is disposed upstream from the mesh position in the direction of rotation of the support roller such that the mesh position and the slit define a circumferential angle not smaller than about 20 degrees.

20 Claims, 6 Drawing Sheets

(56) References Cited

U.S. PATENT DOCUMENTS

| | | |
|---|---|---|
| 2011/0052285 A1 | 3/2011 | Fukuhata |
| 2011/0311283 A1 | 12/2011 | Fukuhata |
| 2012/0002997 A1 | 1/2012 | Hiraoka et al. |
| 2012/0020690 A1 | 1/2012 | Yamamoto et al. |
| 2014/0072357 A1 | 3/2014 | Fukuhata et al. |
| 2014/0083821 A1* | 3/2014 | Hozumi ............ G03G 15/1615 198/806 |
| 2015/0139705 A1 | 5/2015 | Furuichi et al. |

FOREIGN PATENT DOCUMENTS

| | | |
|---|---|---|
| JP | 2004-286933 | 10/2004 |
| JP | 2004-325750 | 11/2004 |
| JP | 2006-201512 | 8/2006 |
| JP | 2015-099185 | 5/2015 |

\* cited by examiner

BELT DEVICE, FIXING DEVICE, AND IMAGE FORMING APPARATUS

CROSS-REFERENCE TO RELATED APPLICATION

This patent application is based on and claims priority pursuant to 35 U.S.C. §119 to Japanese Patent Application No. 2014-153708, filed on Jul. 29, 2014, in the Japanese Patent Office, the entire disclosure of which is hereby incorporated by reference herein.

BACKGROUND

1. Technical Field

Exemplary aspects of the present disclosure relate to a belt device, a fixing device, and an image forming apparatus, and more particularly, to a belt device incorporating a belt, a fixing device for fixing a toner image on a recording medium and incorporating the belt, and an image forming apparatus incorporating the fixing device.

2. Description of the Background

Related-art image forming apparatuses, such as copiers, facsimile machines, printers, or multifunction printers having two or more of copying, printing, scanning, facsimile, plotter, and other functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a developing device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such fixing device may include a fixing rotator, such as a fixing roller, a fixing belt, and a fixing film, heated by a heater and a pressure rotator, such as a pressure roller and a pressure belt, pressed against the fixing rotator to form a fixing nip therebetween through which a recording medium bearing a toner image is conveyed. As the recording medium bearing the toner image is conveyed through the fixing nip, the fixing rotator and the pressure rotator apply heat and pressure to the recording medium, melting and fixing the toner image on the recording medium.

SUMMARY

This specification describes below an improved belt device. In one exemplary embodiment, the belt device includes a belt and a support supporting the belt. A support roller rotatable in a predetermined direction of rotation supports the belt and includes a plurality of shafts disposed at both lateral ends of the support roller in an axial direction thereof, respectively. A driven gear is mounted on one of the plurality of shafts of the support roller. A driving gear meshes with the driven gear at a mesh position to transmit a driving force to the support roller through the driven gear to rotate the support roller. An elastic bearing rotatably bears each of the plurality of shafts of the support roller and has an inner diameter smaller than an outer diameter of the shaft of the support roller. The bearing includes a slit defining a part of the bearing in a circumferential direction thereof. The slit is disposed upstream from the mesh position in the direction of rotation of the support roller such that the mesh position and the slit define a circumferential angle not smaller than about 20 degrees.

This specification further describes below an improved fixing device. In one exemplary embodiment, the fixing device includes a belt and a heater disposed opposite the belt to heat the belt. A pressure rotator contacts the belt to form a fixing nip therebetween, through which a recording medium bearing a toner image is conveyed. A support supports the belt. A support roller rotatable in a predetermined direction of rotation supports the belt and includes a plurality of shafts disposed at both lateral ends of the support roller in an axial direction thereof, respectively. A gear train is connected to the pressure rotator and the support roller to drive the pressure rotator and the support roller. The gear train includes a driven gear mounted on one of the plurality of shafts of the support roller and a driving gear meshing with the driven gear at a mesh position to transmit a driving force to the support roller through the driven gear to rotate the support roller. An elastic bearing rotatably bears each of the plurality of shafts of the support roller and has an inner diameter smaller than an outer diameter of the shaft of the support roller. The bearing includes a slit defining a part of the bearing in a circumferential direction thereof. The slit is disposed upstream from the mesh position in the direction of rotation of the support roller such that the mesh position and the slit define a circumferential angle not smaller than about 20 degrees.

This specification further describes an improved image forming apparatus. In one exemplary embodiment, the image forming apparatus includes an image forming device to form a toner image and a fixing device disposed downstream from the image forming device in a recording medium conveyance direction to fix the toner image on a recording medium. The fixing device includes a belt and a heater disposed opposite the belt to heat the belt. A pressure rotator contacts the belt to form a fixing nip therebetween, through which the recording medium bearing the toner image is conveyed. A support supports the belt. A support roller rotatable in a predetermined direction of rotation supports the belt and includes a plurality of shafts disposed at both lateral ends of the support roller in an axial direction thereof, respectively. A gear train is connected to the pressure rotator and the support roller to drive the pressure rotator and the support roller. The gear train includes a driven gear mounted on one of the plurality of shafts of the support roller and a driving gear meshing with the driven gear at a mesh position to transmit a driving force to the support roller through the driven gear to rotate the support roller. An elastic bearing rotatably bears each of the shafts of the support roller and has an inner diameter smaller than an outer diameter of the shaft of the support roller. The bearing includes a slit defining a part of the bearing in a circumferential direction thereof. The slit is disposed upstream from the mesh position in the direction of rotation of the support roller such that the mesh position and the slit define a circumferential angle not smaller than about 20 degrees.

BRIEF DESCRIPTION OF THE DRAWINGS

A more complete appreciation of the disclosure and the many attendant advantages thereof will be readily obtained as the same becomes better understood by reference to the following detailed description when considered in connection with the accompanying drawings, wherein.

DETAILED DESCRIPTION OF THE DISCLOSURE

Figure 1:
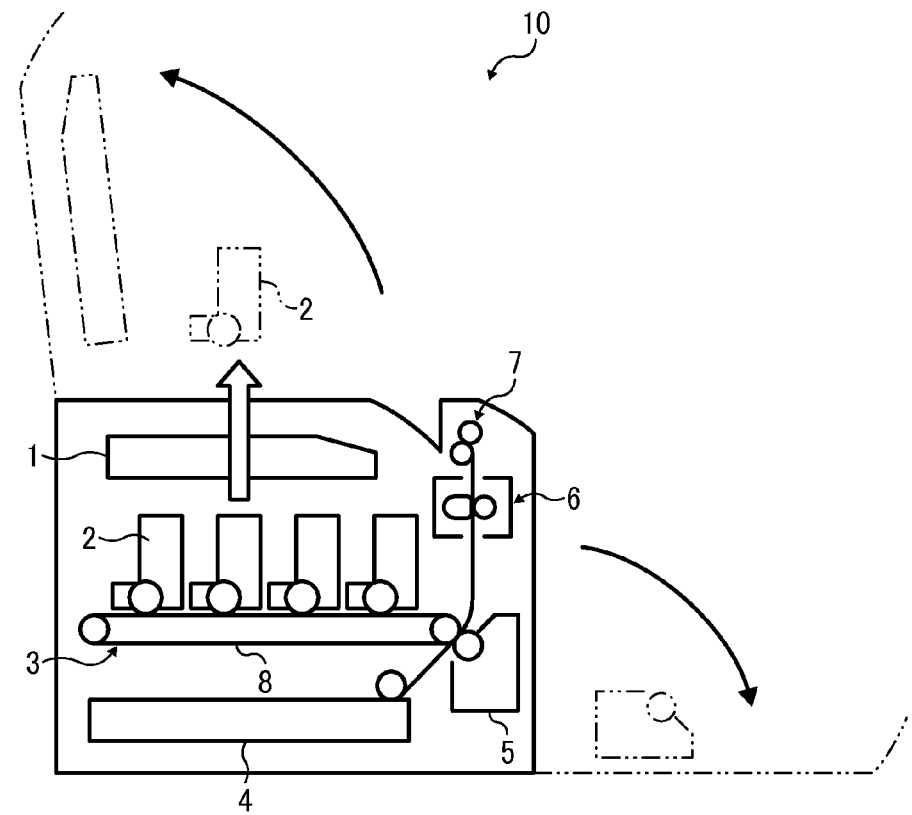
FIG. 1 is a schematic vertical sectional view of an image forming apparatus according to an exemplary embodiment of the present disclosure.

In describing exemplary embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views, in particular to FIG. 1, an image forming apparatus 10 according to an exemplary embodiment of the present disclosure is explained.

It is to be noted that, in the drawings for explaining exemplary embodiments of this disclosure, identical reference numerals are assigned, as long as discrimination is possible, to components such as members and component parts having an identical function or shape, thus omitting description thereof once it is provided.

FIG. 1 is a schematic vertical sectional view of the image forming apparatus 10. The image forming apparatus 10 may be a copier, a facsimile machine, a printer, a multifunction peripheral or a multifunction printer (MFP) having at least one of copying, printing, scanning, facsimile, and plotter functions, or the like. According to this exemplary embodiment, the image forming apparatus 10 is a color printer that forms color and monochrome toner images on recording media by electrophotography. Alternatively, the image forming apparatus 10 may be a monochrome printer that forms a monochrome toner image on a recording medium.

A description is provided of a construction of the image forming apparatus 10.

The image forming apparatus 10 is a tandem color image forming apparatus that forms color and monochrome toner images on recording media through electrophotographic image formation processes. The image forming apparatus 10 includes a writing device 1 serving as an optical writer or an exposure device and four process cartridges 2 serving as an image forming device containing toners in four colors, that is, black, cyan, magenta, and yellow, respectively. For example, toner may contain oily silica, that is, silica containing oil, as an additive. Thus, the toner allows a fixing device 6 to save energy.

The image forming apparatus 10 further includes a primary transfer device 3 serving as a primary transferor; a sheet feeder 4 serving as a recording medium supply; a secondary transfer device 5 serving as a secondary transferor; the fixing device 6; and an output roller pair 7 serving as a recording medium ejector.

The fixing device 6 is detachably or undetachably installed in the image forming apparatus 10. If the fixing device 6 is detachably attached to the image forming apparatus 10, the image forming apparatus 10 facilitates maintenance of the fixing device 6. Conversely, if the fixing device 6 is undetachably installed in the image forming apparatus 10, the image forming apparatus 10 is downsized, reducing manufacturing costs.

The primary transfer device 3 includes an intermediate transfer belt 8 serving as an intermediate transferor that bears black, cyan, magenta, and yellow toner images formed by the process cartridges 2, respectively, and superimposed on the intermediate transfer belt 8. The secondary transfer device 5 secondarily transfers the black, cyan, magenta, and yellow toner images constituting a color toner image primarily transferred onto the intermediate transfer belt 8 by the primary transfer device 3 onto a sheet serving as a recording medium. The sheet feeder 4 loads a plurality of sheets and supplies a sheet to a secondary transfer nip formed between the secondary transfer device 5 and the intermediate transfer belt 8.

The fixing device 6 fixes the color toner image on the sheet. The output roller pair 7 ejects the sheet bearing the fixed color toner image onto an outside of the image forming apparatus 10. Each of the process cartridges 2, the primary transfer device 3, the sheet feeder 4, the secondary transfer device 5, and the fixing device 6 is a unit detachably attached to the image forming apparatus 10. Hence, the process cartridge 2, the primary transfer device 3, the sheet feeder 4, the secondary transfer device 5, and the fixing device 6 may be called a process unit, a primary transfer unit, a sheet feeding unit, a secondary transfer unit, and a fixing unit, respectively.

Figure 2:
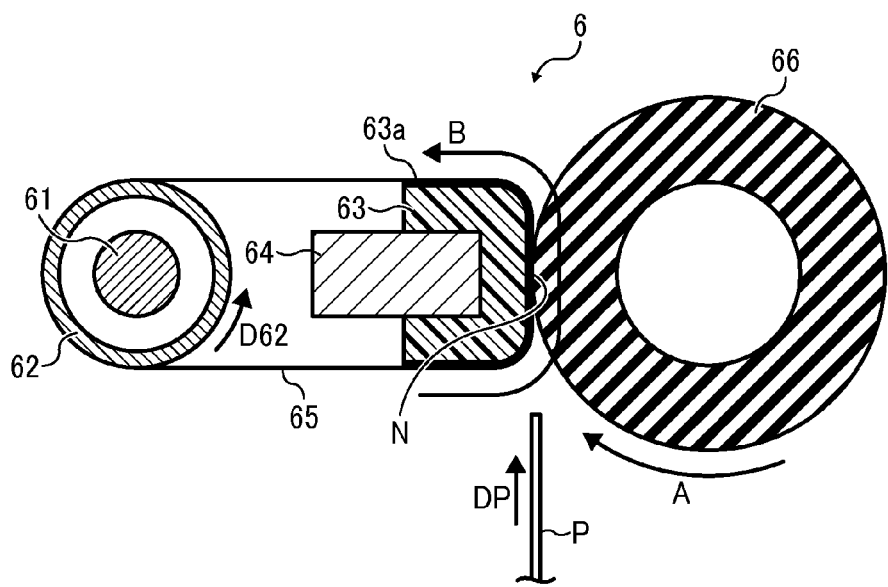
FIG. 2 is a schematic vertical sectional view of a fixing device according to a first exemplary embodiment of the present disclosure that is installed in the image forming apparatus shown in FIG. 1.

With reference to FIG. 2, a description is provided of a construction of the fixing device 6 according to a first exemplary embodiment that is incorporated in the image forming apparatus 10 described above.

FIG. 2 is a schematic vertical sectional view of a main section of the fixing device 6. The fixing device 6 (e.g., a fuser or a fusing unit) includes a fixing pad 63 serving as a support; a heating roller 62 serving as a support or a support roller; a fixing stay 64 that supports the fixing pad 63; a fixing belt 65 looped over the heating roller 62 and the fixing pad 63; and a pressure roller 66. A driver drives the heating roller 62 and the pressure roller 66 to prevent the fixing belt 65 from being slipped by friction between the fixing belt 65 and the fixing pad 63.

Figure 9:
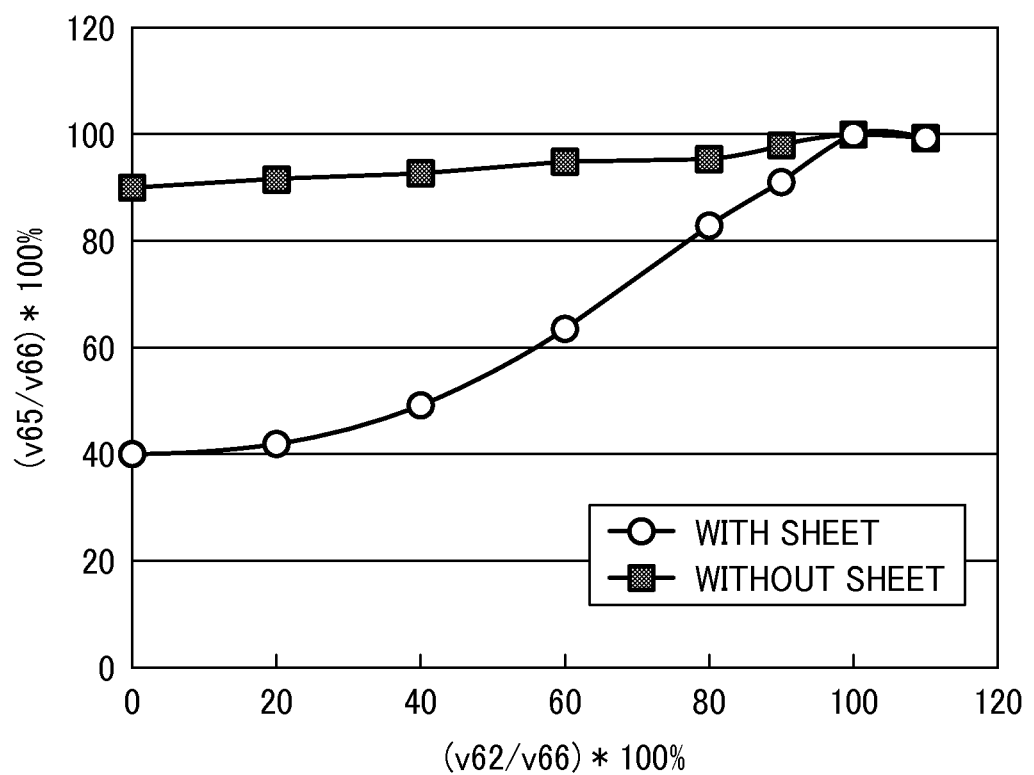
FIG. 9 is a graph showing a relation between a circumferential speed ratio of a circumferential speed of the heating roller with respect to a circumferential speed of a pressure roller and a circumferential speed ratio of a circumferential speed of a fixing belt with respect to the circumferential speed of the pressure roller.

A detailed description of the speed at which the heating roller 62 and the pressure roller 66 are driven and rotated is deferred with reference to FIG. 9.

Slippage of the fixing belt 65 is prevented precisely when a circumferential speed ratio of a circumferential speed of the heating roller 62 with respect to a circumferential speed of the pressure roller 66 is greater than 100 percent slightly.

The fixing stay 64 supports the fixing pad 63 such that the fixing pad 63 is movable in a direction in which the fixing pad 63 is disposed opposite the pressure roller 66. The fixing stay 64 has a predetermined rigidity great enough to be immune from deformation by pressure from the fixing pad 63.

The fixing device 6 further includes a heater 61 disposed inside the heating roller 62. The heater 61 heats the heating roller 62 which in turn heats the fixing belt 65. As the fixing belt 65 travels through a fixing nip N formed between the fixing belt 65 and the pressure roller 66 pressed against the fixing belt 65, the fixing belt 65 heats a sheet P serving as a recording medium bearing a toner image while the sheet P is conveyed through the fixing nip N. A thermistor detects the temperature of an outer circumferential surface of the fixing belt 65. A controller (e.g., a processor), that is, a central processing unit (CPU) provided with a random-access memory (RAM) and a read-only memory (ROM), for example, controls the heater 61 based on a temperature of the fixing belt 65 detected by the thermistor.

As the sheet P bearing the unfixed toner image is conveyed through the fixing nip N formed between the pressure roller 66 and the fixing belt 65 heated to a predetermined temperature, the toner image is fixed on the sheet P. According to this exemplary embodiment, the fixing belt 65 has a three layer structure constructed of a base layer made of heat resistant polyimide (PI) resistant against temperatures not greater than about 200 degrees centigrade; an elastic layer made of silicone rubber having a rubber rigidity of about 25 degrees; and a release layer made of fluoroplastic.

The pressure roller 66 includes a hollow or solid metal roller and a thermally stable, elastic layer made of silicone rubber or the like. According to this exemplary embodiment, the elastic layer has a thickness of about 6 mm. The pressure roller 66 further includes a release layer made of resin, for example, tetrafluoroethylene-perfluoroalkylvinylether copolymer (PFA) or polytetrafluoroethylene (PTFE), and constituting an outer circumferential surface that facilitates separation of the sheet P from the pressure roller 66.

A driving force generated by a driving source (e.g., a motor) situated inside the image forming apparatus 10 depicted in FIG. 1 is transmitted to one end of the pressure roller 66 in an axial direction thereof through a gear train or the like. The pressure roller 66 is driven and rotated by the driving force while the pressure roller 66 is pressed against the fixing pad 63 via the fixing belt 65.

The fixing belt 65 is rotatably supported by the heating roller 62 and the fixing pad 63 situated inside a loop formed by the fixing belt 65. The fixing belt 65 and the pressure roller 66 form the fixing nip N through which the sheet P is conveyed.

As the pressure roller 66 is driven and rotated in a rotation direction A, the fixing belt 65 is frictionally rotated by the pressure roller 66 in a rotation direction B while the fixing belt 65 slides over the fixing pad 63. Optionally, the fixing pad 63 may be attached with a slide sheet 63*a* having a decreased friction coefficient to facilitate sliding of the fixing belt 65 over the fixing pad 63.

The fixing pad 63, made of an elastic body such as silicone rubber and fluoro rubber, heat resistant resin, or metal, may contact an inner circumferential surface of the fixing belt 65 directly or may be disposed opposite the inner circumferential surface of the fixing belt 65 via the slide sheet 63*a*, a coating layer that facilitates sliding of the fixing belt 65 over the fixing pad 63, or the like. According to this exemplary embodiment, the fixing pad 63 includes a resin pad mounting the slide sheet 63*a*. A lubricant such as grease and silicone oil is interposed between the inner circumferential surface of the fixing belt 65 and the slide sheet 63*a* to facilitate sliding of the fixing belt 65 over the slide sheet 63*a*.

Figure 3:
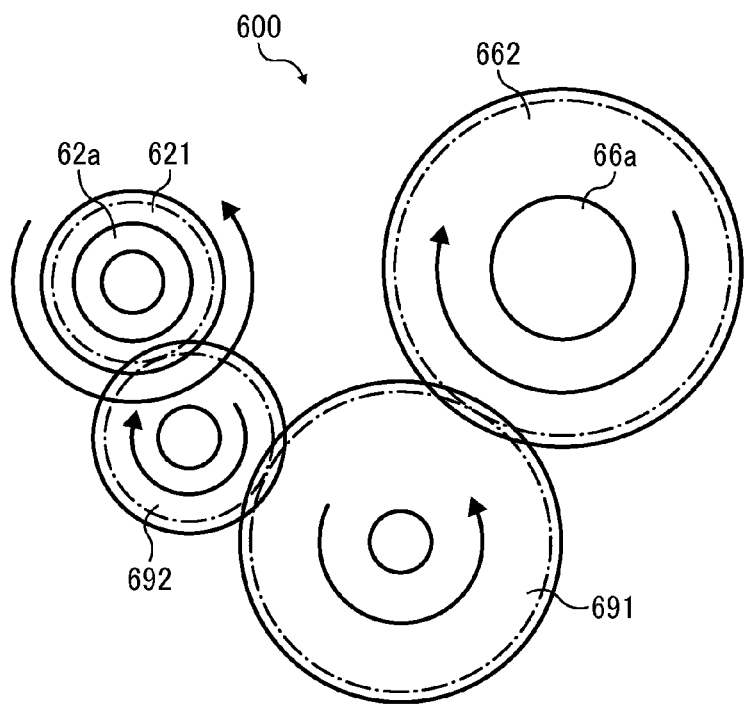
FIG. 3 is a schematic vertical sectional view of a driver incorporated in the fixing device shown in FIG. 2.

With reference to FIG. 3, a description is provided of a construction of a driver 600, that is, a gear train, that drives and rotates the heating roller 62 and the pressure roller 66 depicted in FIG. 2.

FIG. 3 is a schematic vertical sectional view of the driver 600. As shown in FIG. 3, a pressure roller gear 662 serving as a driven gear is driven by a driving force transmitted from a driving gear situated inside the image forming apparatus 10 through an idler gear 691 serving as a relay gear.

The heating roller 62 and the pressure roller 66 are driven and rotated by a driving force transmitted from the driving source (e.g., the motor) located inside the image forming apparatus 10 through the gear train or the like. FIG. 3 is a diagram showing a driving force transmission system that drives and rotates the heating roller 62 and the pressure roller 66 depicted in FIG. 2. As shown in FIG. 3, the pressure roller gear 662 serving as the driven gear mounted on a shaft 66*a* mounting the pressure roller 66 is driven by the driving force transmitted from the driving gear situated inside the image forming apparatus 10 through the idler gear 691 serving as the relay gear.

A heating roller gear 621 serving as a driven gear mounted on a shaft 62*a* mounting the heating roller 62 is driven by the driving force transmitted through the idler gear 691 and an idler gear 692. The gear train differentiates the circumferential speed of the pressure roller 66 from the circumferential speed of the heating roller 62.

As shown in FIGS. 2 and 3, as the pressure roller 66 is driven and rotated by the driving source through the gear train, the driving force is transmitted to the fixing belt 65 at the fixing nip N, rotating the fixing belt 65 in accordance with rotation of the pressure roller 66. At the fixing nip N, the fixing belt 65 is rotated in the rotation direction B while it is sandwiched between the fixing pad 63 and the pressure roller 66. Conversely, at a position other than the fixing nip N, the fixing belt 65 is guided by the fixing pad 63.

Pressure exerted by the pressure roller 66 to the fixing belt 65 is transmitted to the fixing belt 65, the slide sheet 63*a*, and the fixing pad 63 in this order and received by the fixing pad 63, the fixing stay 64, or the heating roller 62.

Figure 4:
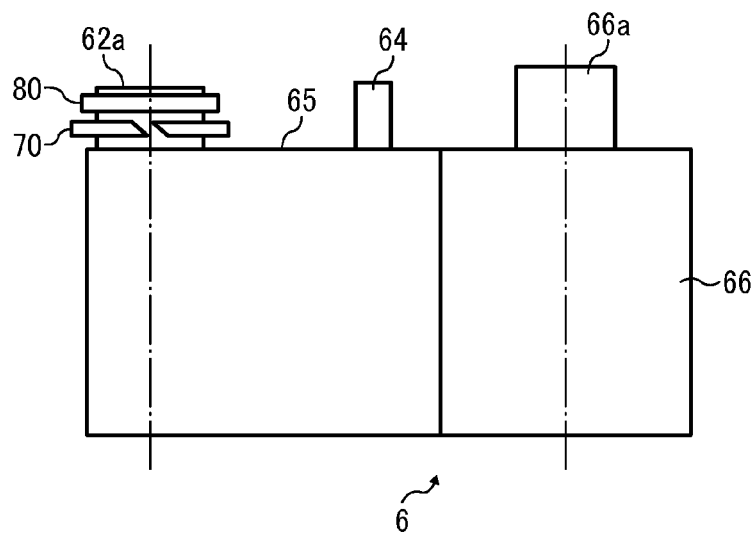
FIG. 4 is a partial plan view of the fixing device shown in FIG. 2 illustrating one end of the fixing device in a longitudinal direction thereof.

FIG. 4 is a partial plan view of the fixing device 6 illustrating one end of the fixing device 6 in a longitudinal direction thereof parallel to the axial direction of the pressure roller 66. As shown in FIG. 4, a bearing 70 contacts and supports the shaft 62*a* of the heating roller 62. FIG. 4 illustrates the bearing 70 situated at one lateral end of the heating roller 62 in an axial direction thereof. However, the bearing 70 is also situated at another lateral end of the heating roller 62 in the axial direction thereof symmetrically with the bearing 70 shown in FIG. 4. A ring 80 is placed on one lateral end of the shaft 62*a* of the heating roller 62 and disposed outboard from the bearing 70 in the axial direction of the heating roller 62 to prevent the bearing 70 from falling off the shaft 62*a* of the heating roller 62. The ring 80 is also placed on another lateral end of the shaft 62*a* of the heating roller 62 in the axial direction thereof symmetrically with the ring 80 shown in FIG. 4.

Figure 5:
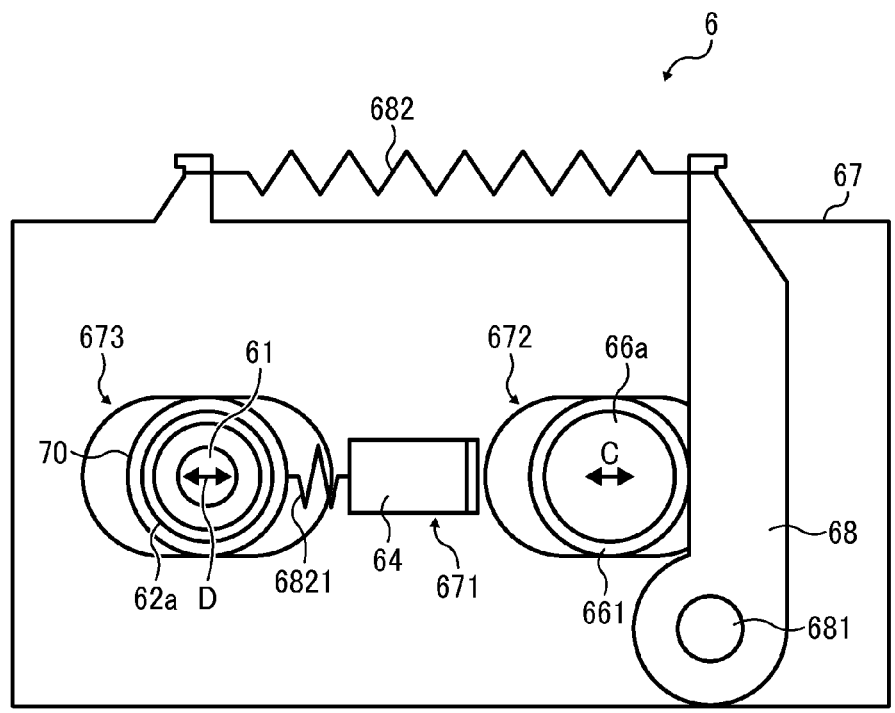
FIG. 5 is a vertical sectional view of the fixing device shown in FIG. 2 illustrating a holding mechanism incorporated therein.

FIG. 5 is a vertical sectional view of the fixing device 6 illustrating a holding mechanism that holds or supports the heating roller 62, the fixing stay 64, and the pressure roller 66 at each lateral end in an axial direction thereof. The fixing stay 64 engages a stay holding hole 671 provided in a frame 67 serving as a fixing frame of the fixing device 6, thus being mounted on the frame 67.

The pressure roller 66 is held by a pressure roller holding hole 672 via a pressure roller bearing 661. For example, the pressure roller bearing 661 supporting the shaft 66a of the pressure roller 66 engages the pressure roller holding hole 672. The pressure roller bearing 661 is a C-shaped slide bearing, for example. The pressure roller bearing 661 is movable in the pressure roller holding hole 672 in a direction C.

A pressure lever 68 is pivotable about a shaft 681 mounted on the frame 67 of the fixing device 6. A pressure spring 682 causes the pressure lever 68 to contact and bias against the pressure roller bearing 661 leftward in FIG. 5.

Accordingly, the pressure roller 66 exerts a fixing load to the fixing pad 63 depicted in FIG. 2. The pressure roller 66 includes the elastic layer made of rubber. As shown in FIG. 2, as the pressure roller 66 is pressed against the fixing pad 63, the elastic layer deforms in a predetermined amount, positioning the pressure roller 66 with respect to the fixing belt 65.

As shown in FIG. 5, the heating roller 62 is held by a heating roller holding hole 673 via the bearing 70. For example, the bearing 70 supporting the shaft 62a of the heating roller 62 engages the heating roller holding hole 673. The bearing 70 is a C-shaped slide bearing described below, for example.

The bearing 70 is movable in the heating roller holding hole 673 in a direction D. A belt tension spring 6821 is anchored to the bearing 70 and the fixing stay 64 to exert a predetermined tension to the fixing belt 65 through the heating roller 62.

A description is provided of a construction of a comparative fixing device.

The comparative fixing device includes a fixing belt looped over a plurality of support rollers extending parallel to each other.

Parallelism between the support rollers may degrade due to accumulation of dimensional tolerance of parts, variation in a driving force received by the support rollers, and the like.

As the fixing belt rotates while parallelism between the support rollers degrades, the fixing belt is susceptible to a skew force that skews the fixing belt in an axial direction of the support rollers. When the fixing belt receives the skew force, the fixing belt may be skewed in the axial direction of the support roller. When the fixing belt is skewed in a predetermined amount or more, the fixing belt may not convey a sheet serving as a recording medium properly, resulting in creasing or jamming of the sheet.

As the fixing belt is skewed in the axial direction of the support roller, a lateral end of the fixing belt in an axial direction thereof may fall off the support roller and come into contact with a side plate that supports the support roller. As the lateral end of the fixing belt contacts the side plate, the fixing belt may slide over the side plate and may be damaged, decreasing a life of the fixing belt.

Parallelism between the support rollers is affected by a bearing that bears at least one of the support rollers. If a gap in a range of from about 0.05 mm to about 0.1 mm is provided between an inner circumferential surface of the bearing and an outer circumferential surface of the shaft of the support roller, parallelism between the support rollers may degrade or the bearing may tilt. Further, the lateral end of the fixing belt may enter the gap between the bearing and the shaft of the support roller, resulting in breakage of the lateral end of the fixing belt.

A description is provided of a configuration of the bearing 70.

Figure 6:
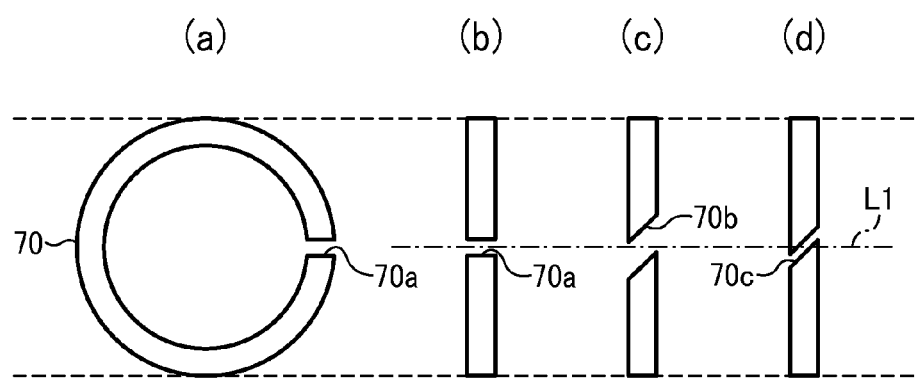
FIG. 6 is a vertical sectional view of a bearing incorporated in the fixing device shown in FIG. 5.

FIG. 6 is a vertical sectional view of the bearing 70. As shown in FIG. 6, the bearing 70, that is, the C-shaped slide bearing that supports the heating roller 62, includes a slit variably shaped. The slit of the bearing 70 is shaped arbitrarily and is not restricted.

For example, the bearing 70 includes a horizontal slit edge 70a as shown in diagrams (a) and (b) in FIG. 6. The horizontal slit edge 70a is parallel to a diametrical direction of the bearing 70 or the heating roller 62. Alternatively, the bearing 70 may include an oblique slit edge 70b shown in a diagram (c) in FIG. 6 or an oblique slit edge 70c shown in a diagram (d) in FIG. 6. The oblique slit edges 70b and 70c are oblique relative to a horizontal line L1 indicated by an alternate long and short dash line.

The oblique slit edge 70b is different from the oblique slit edge 70c in that the oblique slit edge 70b prohibits a part of the bearing 70 from overlapping the horizontal line L1, whereas the oblique slit edge 70c allows a part of the bearing 70 to overlap the horizontal line L1. That is, the slit edge 70b does not overlap the opposed slit edge 70b in a circumferential direction of the bearing 70. Conversely, the slit edge 70c overlaps the opposed slit edge 70c in the circumferential direction of the bearing 70.

Grease is applied to a slide portion interposed between the bearing 70 and the shaft 62a of the heating roller 62 depicted in FIG. 5. The grease is resistant against temperatures not smaller than about 300 degrees centigrade that is higher than a fixing temperature at which the toner image is fixed on the sheet P to retain its property stably. The viscosity of the grease is not restricted. However, it is preferable that the grease does not dry at a decreased viscosity. If grease or oil having a decreased viscosity is used, an oil receiver or a grease receiver is installed in the fixing device 6. The bearing 70 is attached to the frame 67. The shaft 62a of the heating roller 62 over which the fixing belt 65 is looped is press-fitted into the bearing 70.

A detailed description is provided of a configuration of the bearing 70, the pressure roller 66, the fixing belt 65, and the heating roller 62.

A detailed description is now given of a configuration of the bearing 70.

The bearing 70 is made of heat resistant resin resistant against temperatures of the heating roller 62 heated by the heater 61 such as polyphenylenesulfide (PPS), liquid crystal polymer (LCD), and polyamide imide (PAT).

An inner diameter of the bearing 70 is slightly smaller than an outer diameter of the shaft 62a of the heating roller 62 disposed at each lateral end of the heating roller 62 in the axial direction thereof to press-fit the shaft 62a into the bearing 70. For example, the inner diameter of the bearing 70 is smaller than the outer diameter of the shaft 62a by a range of from about 0.01 mm to about 0.05 mm that is desirable for press fitting.

According to this exemplary embodiment, the bearing 70 having the inner diameter smaller than the outer diameter of the shaft 62a by 0.03 mm is press-fitted with the shaft 62a. If the bearing 70 having the inner diameter smaller than the outer diameter of the shaft 62a by a length greater than 0.05 mm is press-fitted with the shaft 62a with increased pressure, as the fixing device 6 is attached to the frame 67 installed in the image forming apparatus 10, the bearing 70 presses against the shaft 62a excessively. Accordingly, as the heating roller 62 rotates, a driving torque may increase excessively, shaving the heating roller 62 or the bearing 70.

Conversely, if the bearing 70 having the inner diameter smaller than the outer diameter of the shaft 62a by a length smaller than 0.01 mm is press-fitted with the shaft 62a with decreased pressure, the bearing 70 presses against the shaft 62a insufficiently. Accordingly, the slit edge (e.g., the slit edges 70a, 70b, and 70c) may be spaced apart from the opposed slit edge excessively, degrading parallelism between the heating roller 62 and the fixing pad 63 and skewing the fixing belt 65.

The inner diameter of the bearing 70 is smaller than the outer diameter of the shaft 62a of the heating roller 62 to press-fit the shaft 62a into the bearing 70 as described above. Hence, no interval is provided between the bearing 70 and the shaft 62a of the heating roller 62. Accordingly, a mounting position of the bearing 70 on the frame 67 and a mounting position of the fixing stay 64 on the frame 67 define a desired parallelism between the heating roller 62 and the fixing stay 64. The desired parallelism reduces skew of the fixing belt 65.

A detailed description is now given of a configuration of the pressure roller 66.

As shown in FIG. 5, the pressure spring 682 biases the pressure roller 66 against the fixing belt 65. As the elastic layer of the pressure roller 66 is pressed and deformed, the pressure roller 66 produces the fixing nip N having a predetermined length in a sheet conveyance direction DP as shown in FIG. 2. According to this exemplary embodiment, the fixing nip N has the predetermined length of 5 mm in the sheet conveyance direction DP. Optionally, a heater such as a halogen heater may be disposed inside the pressure roller 66.

According to this exemplary embodiment, a halogen heater serving as the heater 61 is disposed inside the heating roller 62 and no halogen heater is disposed inside the pressure roller 66. Silicone rubber of the elastic layer of the pressure roller 66 may be solid rubber or sponge rubber foam. The sponge rubber is more preferable than the solid rubber because it has an increased insulation that draws less heat from the fixing belt 65.

A detailed description is now given of a configuration of the fixing belt 65.

The fixing belt 65 is an endless belt or film including the base layer made of resin such as polyimide, polyamide, and fluoroplastic. According to this exemplary embodiment, the base layer of the fixing belt 65 is made of polyimide.

The fixing belt 65 further includes the release layer constituting a surface layer and made of resin such as PFA and PTFE to facilitate separation of toner of the toner image on the sheet P from the fixing belt 65, thus preventing toner of the toner image from adhering to the fixing belt 65. The elastic layer, made of silicone rubber or the like, is sandwiched between the base layer and the release layer. For example, the elastic layer has a thickness not greater than about 500 micrometers. According to this exemplary embodiment, the elastic layer has a thickness of 180 micrometers. The release layer constituting the surface layer is a PFA tube having a thickness of about 20 micrometers and coating the elastic layer.

If the fixing belt 65 does not incorporate the elastic layer made of silicone rubber, the fixing belt 65 has a decreased thermal capacity that enhances fixing property of being heated quickly to a predetermined fixing temperature at which the toner image is fixed on the sheet P. However, the pressure roller 66 and the fixing belt 65 may not sandwich and press the unfixed toner image on the sheet P passing through the fixing nip N evenly. Accordingly, as the sheet P is conveyed through the fixing nip N, slight surface asperities of the fixing belt 65 and the sheet P may be transferred onto the solid toner image on the sheet P, producing variation in gloss of the toner image that appears as an orange peel image on the sheet P. To address this circumstance, the elastic layer made of silicone rubber has a thickness not smaller than about 100 micrometers. As the elastic layer deforms, the elastic layer absorbs slight surface asperities of the fixing belt 65 and the sheet P, preventing formation of the faulty orange peel image.

The inner circumferential surface of the fixing belt 65 is applied with the lubricant such as silicone oil and fluorine grease to reduce friction between the fixing pad 63 and the fixing belt 65 sliding thereover. Accordingly, the lubricant may be interposed between the heating roller 62 and the fixing belt 65.

A detailed description is now given of a configuration of the heating roller 62.

The hollow heating roller 62, serving as a support roller or a support, includes a metal tube or pipe made of aluminum, iron, stainless steel, or the like. According to this exemplary embodiment, the heating roller 62 is made of iron. The heating roller 62 is circular in cross-section and has a diameter greater than an apparent diameter of the heater 61 by about 1 mm. An inner circumferential surface of the heating roller 62 is treated with black coating to facilitate absorption of heat radiated from the heater 61 (e.g., the halogen heater) and the like. According to this exemplary embodiment, a halogen heater of 550 W is used as the heater 61.

The heater 61 is not limited to the halogen heater. For example, instead of the halogen heater, a resistance heat generator, a carbon heater, or the like may be employed as a heater that heats the fixing belt 65, if a decreased interval is provided between the heating roller 62 and the heater and a space is barely produced at a lateral end of the heating roller 62.

Since the heating roller 62 drives and rotates the fixing belt 65, in order to facilitate transmission of a driving force from the heating roller 62 to the fixing belt 65, the inner circumferential surface of the heating roller 62 is roughened slightly to retain the lubricant readily. For example, the heating roller 62 has a surface roughness not greater than about Ra 10. The heating roller 62 is exerted with a load in a range of from about 100 N to about 250 N for an A4 size sheet.

Various methods for increasing the surface roughness of the heating roller 62 are available: a method for increasing the surface roughness physically by sandblasting; a method for increasing the surface roughness chemically by etching; and a method for increasing the surface roughness by applying a coating mixed with small-diameter beads.

A detailed description is now given of the circumferential speed of the heating roller 62 and the pressure roller 66.

The fixing belt 65 is driven and rotated mostly by a driving force from the pressure roller 66. For example, as shown in FIG. 2, as the pressure roller 66 rotates in the rotation direction A, the fixing belt 65 rotates in the rotation direction B in accordance with rotation of the pressure roller 66 by friction therebetween. However, as described above, while a sheet P is sandwiched between the fixing belt 65 and the pressure roller 66, that is, during printing when the sheet P is conveyed through the fixing nip N, rotation of the fixing belt 65 may degrade temporarily.

To address this circumstance, when conveyance of the sheet P by the fixing belt 65 is destabilized, the heating roller 62 rotates at a circumferential speed, that is, a surface movement speed, greater than a circumferential speed of the pressure roller 66. Accordingly, even when the sheet P is conveyed through the fixing nip N, conveyance of the sheet P by the fixing belt 65 does not degrade, suppressing slippage of the fixing belt 65 and the sheet P at the fixing nip N. Conversely, when the heating roller 62 and the fixing belt 65 rotate at an identical speed in an identical rotation direction, conveyance of the sheet P by the fixing belt 65 may degrade, if the sheet P conveyed through the fixing nip N slips.

A description is provided of an example of motion of the heating roller 62 when the heating roller 62 rotates at a circumferential speed, that is, the surface movement speed, greater than a circumferential speed of the pressure roller 66.

The fixing belt 65 is driven and rotated mostly by a driving force from the pressure roller 66.

Conveyance of the sheet P by the fixing belt 65 is destabilized while the sheet P is conveyed through the fixing nip N. The circumferential speed of the heating roller 62 is slightly increased relative to the circumferential speed of the pressure roller 66 while conveyance of the sheet P by the fixing belt 65 is destabilized, thus stabilizing conveyance of the sheet P by the fixing belt 65.

According to this exemplary embodiment, the circumferential speed of the heating roller 62 is increased relative to the circumferential speed of the pressure roller 66 by a range of from about 1 percent to about 10 percent. A lower limit of 1 percent defines increasing of the circumferential speed of the heating roller 62 by about 1 percent or more considering an error factor. Increasing by 11 percent or more causes no problem at least initially.

However, after long term use, the inner circumferential surface of the fixing belt 65 may suffer from accelerated abrasion by difference in the circumferential speed between the heating roller 62 and the pressure roller 66 by 11 percent or more. To address this circumstance, when the fixing belt 65 is susceptible to destabilization in conveyance of the sheet P, the controller controls the circumferential speed of the heating roller 62 to be faster than the circumferential speed of the pressure roller 66 by a range of from about 1 percent to about 10 percent. A verification of controlling the circumferential speed of the heating roller 62 and the pressure roller 66 is deferred with reference to FIG. 9.

A description is provided of looping the fixing belt 65 over the heating roller 62 and the fixing pad 63.

As shown in FIG. 2, the fixing belt 65 is stretched taut across a plurality of supports, that is, the heating roller 62 and the fixing pad 63, with tension applied to the fixing belt 65. If an inner diameter of the fixing belt 65 is not greater than ϕ25, the fixing belt 65 incorporating the base layer made of polyimide and having a thickness of 50 micrometers may be looped into an ellipse in its natural state by the strength of the fixing belt 65.

If the adhesion force that adheres the fixing belt 65 to the heating roller 62 is small, a driving force generated by the driver 600 depicted in FIG. 3 to drive and rotate the heating roller 62 is not transmitted from the heating roller 62 to the fixing belt 65, causing slippage of the fixing belt 65. Conversely, if the adhesion force that adheres the fixing belt 65 to the heating roller 62 is excessively great, the corner of the fixing pad 63 made of resin may bend the fixing belt 65, causing slippage of the fixing belt 65.

To address this circumstance, the corner of the fixing pad 63 made of resin has a roundness greater than R1. Thus, it is requested to adjust the adhesion force that adheres the fixing belt 65 to the heating roller 62 properly.

Since it is impossible to measure the adhesion force that adheres the fixing belt 65 to the heating roller 62, tension applied to the fixing belt 65 is adjusted to a predetermined fixed value. According to this exemplary embodiment, tension in a range of from about 0.5 N/m to about 10 N/m is applied to the fixing belt 65, preventing the failures described above.

A description is provided of the adhesion force that adheres the fixing belt 65 to the heating roller 62.

The adhesion force that adheres the fixing belt 65 to the heating roller 62 is affected by tension applied to the inner circumferential surface and the outer circumferential surface of the fixing belt 65 or a stress applied to an interior of the fixing belt 65. Tension is applied to the fixing belt 65 by a plate spring, a cleaning roller, or the like that presses against the fixing belt 65.

The base layer of the fixing belt 65, made of polyimide and constituting the inner circumferential surface of the fixing belt 65 that contacts the heating roller 62, has a surface roughness not greater than about Ra 5. The inner circumferential surface of the fixing belt 65 is applied with silicone oil or grease. Toner may be pulverized toner or polymerization toner. Hydrophobic silica (product name RY50 available from AEROSIL®) in an amount of 2 parts by weight is added to toner in an amount of 100 parts by weight and mixed for 5 minutes with a 20 L Henschel mixer at a circumferential speed of 40 m/sec. Thereafter, the mixture is screened through a sieve with an aperture of 75 microns to obtain toner.

Figure 7:
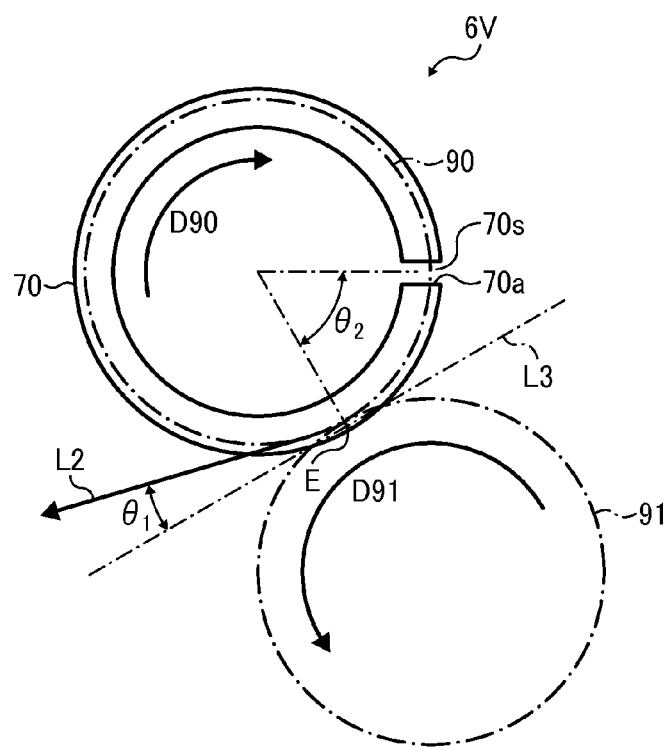
FIG. 7 is a vertical sectional view of the bearing shown in FIG. 6 and a plurality of gears connected to a heating roller incorporated in the fixing device shown in FIG. 2.

FIG. 7 is a vertical sectional view of the bearing 70 and a plurality of gears connected to the heating roller 62. As shown in FIG. 7, a driven gear 90 is mounted on an outer circumference of one end of the shaft 62a of the heating roller 62 in the axial direction thereof. The driven gear 90 meshes with a driving gear 91. FIG. 7 illustrates a pitch circle defined by teeth of each of the driven gear 90 and the driving gear 91.

The driving gear 91 rotates counterclockwise in FIG. 7 in a rotation direction D91. Accordingly, the driven gear 90 and the heating roller 62 rotate clockwise in FIG. 7 in a rotation direction D90. Simultaneously, a drawing rotation force is directed to a mesh portion between the driving gear 91 and the driven gear 90 in a direction L2 defining an angle $\theta_1$ of 20 degrees right upward from a mesh tangent L3 indicated by an alternate long and short dash line.

If the slit edge 70a defining a slit 70s of the bearing 70 is situated in proximity to the direction L2, the drawing rotation force separates the slit edge 70a from the opposed slit edge 70a, enlarging the slit 70s. In order to prevent the drawing rotation force from enlarging the slit 70s, the slit 70s is isolated from a mesh position E where the driving gear 91 meshes with the driven gear 90 in the circumferential direction of the bearing 70 such that the mesh position E and the slit 70s disposed upstream from the mesh position E in the rotation direction D90 corresponding to a rotation direction D62 of the heating roller 62 depicted in FIG. 2 define a circumferential angle $\theta_2$. For example, the circumferential angle $\theta_2$ is not smaller than about 20 degrees.

Figure 8:
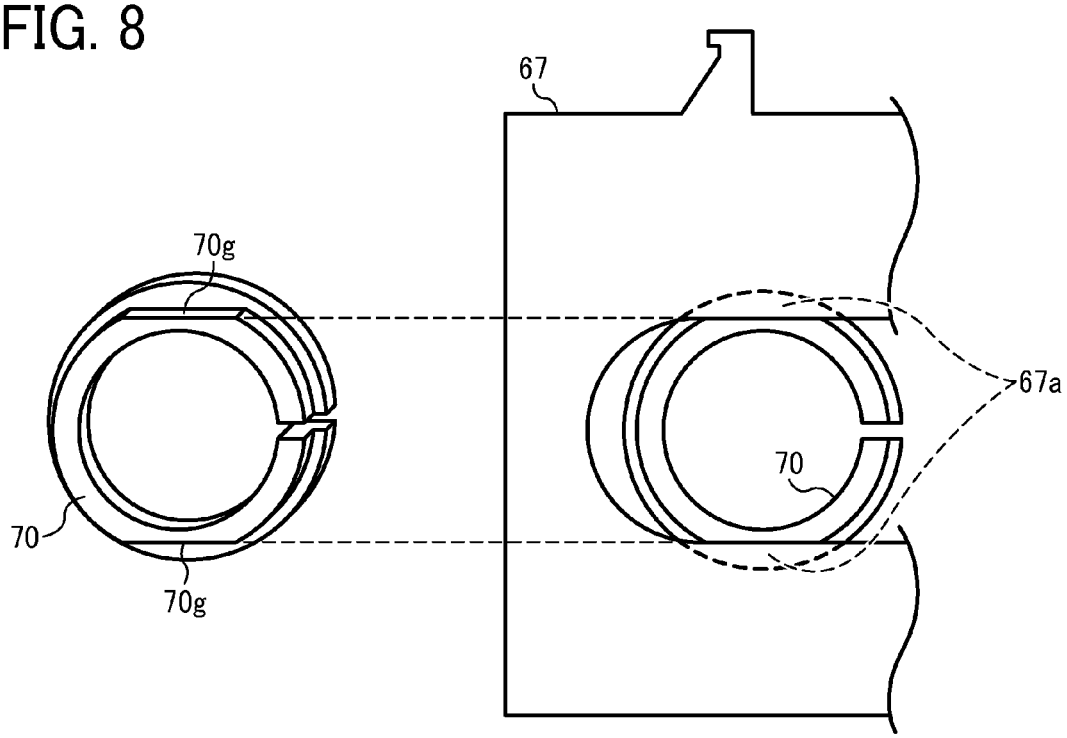
FIG. 8 is a perspective view of the bearing and a frame incorporated in the fixing device shown in FIG. 2.

FIG. 8 is a perspective view of the bearing 70 and the frame 67. As shown in FIG. 8, the bearing 70 may include a detent 70g that contacts an abutment portion 67a of the frame 67 to prevent the bearing 70 from rotating in accordance with rotation of the shaft 62a of the heating roller 62. If the bearing 70 rotates in accordance with rotation of the shaft 62a of the heating roller 62, the slit edge 70a of the bearing 70 may move to a position where the slit edge 70a is susceptible to the drawing rotation force.

Accordingly, the drawing rotation force may enlarge the slit 70s, producing a circumferential gap between the shaft 62a of the heating roller 62 and the bearing 70. Consequently, an axis of the heating roller 62 may shift or the bearing 70 may tilt. If the axis of the heating roller 62 shifts, parallelism of the fixing stay 64 and the heating roller 62 may degrade and the fixing belt 65 may be skewed. To address this circumstance, the detent 70g prevents skew of the fixing belt 65 and tilt of the bearing 70. Additionally, the fixing belt 65 is driven and rotated stably, reducing and saving energy to drive and rotate the fixing belt 65.

With reference to FIG. 9, a description is provided of an experiment for examining conveyance of the sheet P by the fixing belt 65, that is, conveyance of the sheet P by the fixing belt 65, while the sheet P is conveyed through the fixing nip N and while the sheet P is not conveyed through the fixing nip N.

FIG. 9 is a graph showing a relation between a circumferential speed ratio of the circumferential speed of the heating roller 62 with respect to the circumferential speed of the pressure roller 66 and a circumferential speed ratio of the circumferential speed of the fixing belt 65 with respect to the circumferential speed of the pressure roller 66.

In this experiment, hydrophobic silica (product name RY50 available from AEROSIL®) in an amount of 2 parts by weight was added to toner in an amount of 100 parts by weight and mixed for 5 minutes with a 20 L Henschel mixer at a circumferential speed of 40 m/sec. Thereafter, the mixture was screened through a sieve with an aperture of 75 microns to obtain toner.

The circumferential speed of the heating roller 62 and the pressure roller 66 was calculated based on the number of rotations and the radius thereof. The circumferential speed of the fixing belt 65 was calculated by measuring marking on the fixing belt 65 every turn and based on an elapsed time and the outer diameter of the fixing belt 65. The sheet P was plain paper, that is, thin paper having a smooth surface.

In this experiment, when the circumferential speed ratio of the circumferential speed of the fixing belt 65 with respect to the circumferential speed of the pressure roller 66 defined by a formula (1) below is 100 percent, conveyance of the sheet P by the fixing belt 65 is satisfactory.

$$r56=(v65/v66) \times 100 \qquad (1)$$

In the formula (1), r56 represents the circumferential speed ratio of the circumferential speed of the fixing belt 65 with respect to the circumferential speed of the pressure roller 66. v65 represents the circumferential speed of the fixing belt 65. v66 represents the circumferential speed of the pressure roller 66. As shown in FIG. 9, when the circumferential speed ratio of the circumferential speed of the heating roller 62 with respect to the circumferential speed of the pressure roller 66 defined by a formula (2) below is 100 percent or more, conveyance of the sheet P by the fixing belt 65 is satisfactory regardless of whether or not the sheet P is conveyed through the fixing nip N.

$$r26=(v62/v66) \times 100 \qquad (2)$$

In the formula (2), r26 represents the circumferential speed ratio of the circumferential speed of the heating roller 62 with respect to the circumferential speed of the pressure roller 66. v62 represents the circumferential speed of the heating roller 62. v66 represents the circumferential speed of the pressure roller 66. Additionally, the experiment shows that slippage of the fixing belt 65 is prevented more precisely when the circumferential speed ratio of the circumferential speed of the heating roller 62 with respect to the circumferential speed of the pressure roller 66 is greater than 100 percent rather than being equal to 100 percent.

Conversely, the experiment shows that, when the circumferential speed ratio of the circumferential speed of the heating roller 62 with respect to the circumferential speed of the pressure roller 66 is not greater than 90 percent, slippage of the fixing belt 65 occurs regardless of whether or not the sheet P is conveyed through the fixing nip N. Additionally, when the circumferential speed ratio of the circumferential speed of the heating roller 62 with respect to the circumferential speed of the pressure roller 66 is greater than 110 percent, although no problem occurs initially, abrasion of the inner circumferential surface of the fixing belt 65 may accelerate due to difference in the circumferential speed between the heating roller 62 and the pressure roller 66 after long term use.

In order to retain precise conveyance of the sheet P by the fixing belt 65 and thereby prevent slippage of the sheet P, the circumferential speed of the heating roller 62 is greater than the circumferential speed of the pressure roller 66 and the circumferential speed ratio of the circumferential speed of the heating roller 62 with respect to the circumferential speed of the pressure roller 66 is not smaller than 101 percent and not greater than 110 percent. Even if the circumferential speed ratio of the circumferential speed of the heating roller 62 with respect to the circumferential speed of the pressure roller 66 is 100 percent, it is necessary to consider the outer diameter of the heating roller 62 and the pressure roller 66 and variation in the number of rotations of the heating roller 62 and the pressure roller 66. Hence, including error factors, according to this exemplary embodiment, the circumferential speed ratio of the circumferential speed of the heating roller 62 with respect to the circumferential speed of the pressure roller 66 is 102.5 plus-minus 1.5 percent.

A description is provided of a construction of a bearing 70S according to a second exemplary embodiment.

Figure 10C:
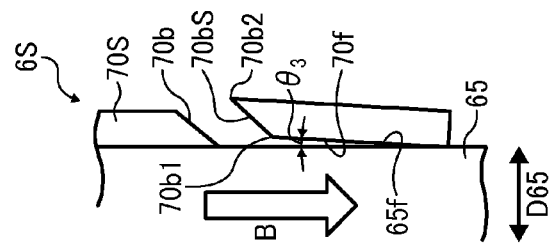
FIG. 10C is a partial sectional view of a fixing belt and a bearing incorporated in the fixing device shown in FIG. 10A.
Figure 10B:
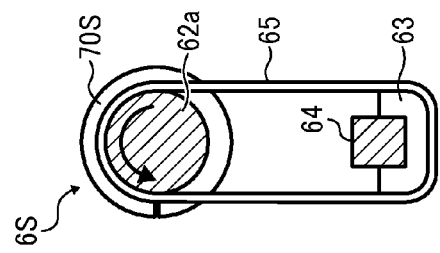
FIG. 10B is a schematic sectional view of the fixing device taken on line b-b in FIG. 10A.
Figure 10A:
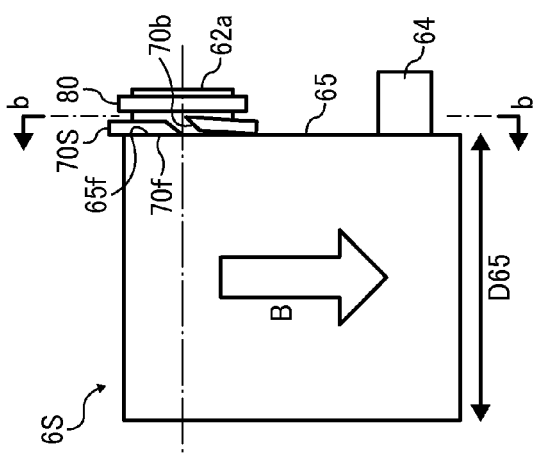
FIG. 10A is a partial plan view of a fixing device according to a second exemplary embodiment of the present disclosure.

FIG. 10A is a partial plan view of a fixing device 6S incorporating the bearing 70S. FIG. 10B is a schematic sectional view of the fixing device 6S taken on line b-b in FIG. 10A. FIG. 10C is a partial sectional view of the fixing belt 65 and the bearing 70S incorporated in the fixing device 6S. FIGS. 10A, 10B, and 10C illustrate one lateral end of the fixing belt 65 in an axial direction D65 thereof. However, the bearing 70S and the like are also situated at another lateral end of the fixing belt 65 in the axial direction D65 symmetrically with the bearing 70S shown in FIGS. 10A, 10B, and 10C. When the fixing belt 65 is skewed rightward in FIG. 10A, the fixing belt 65 comes into contact with the bearing 70S, thus being restricted by the bearing 70S.

An edge face 65f of the fixing belt 65 and an inboard face 70f of the bearing 70S disposed opposite and coming into contact with each other attain separation from each other to reduce friction therebetween. Separation between the fixing belt 65 and the bearing 70S is achieved as the edge face 65f of the fixing belt 65 and the inboard face 70f of the bearing 70S are made of or coated with a material that facilitates separation. For example, the edge face 65f of the fixing belt 65 and the inboard face 70f of the bearing 70S are treated with coating, taping, or the like of fluorine.

Accordingly, even after the fixing belt 65 contacts the bearing 70S for an extended period of time, the edge face 65f of the fixing belt 65 and the inboard face 70f of the bearing 70S are immune from abrasion and breakage. Further, the fixing belt 65 is immune from being caught in a gap produced between an inner circumferential surface of the bearing 70S and the shaft 62a of the heating roller 62.

A slit edge 70bS of the bearing 70S is isolated from the fixing belt 65. Alternatively, as shown in FIG. 10C, if the slit edge 70bS of the bearing 70S is configured to contact the fixing belt 65 due to a construction of parts, the upstream slit edge 70b disposed upstream from the opposed slit edge 70bS in the rotation direction B of the fixing belt 65 may contact the fixing belt 65 and the downstream slit edge 70bS disposed downstream from the upstream slit edge 70b in the rotation direction B of the fixing belt 65 may be isolated from the fixing belt 65, thus preventing breakage of the fixing belt 65.

For example, an inboard end 70*b*1 of the downstream slit edge 70*b*S is shifted or offset outboard and isolated from the fixing belt 65 in the axial direction D65 of the fixing belt 65 perpendicular to the rotation direction B of the fixing belt 65 such that the inboard face 70*f* of the bearing 70S disposed opposite the edge face 65*f* of the fixing belt 65 is tilted relative to the edge face 65*f* of the fixing belt 65 to define an angle $\theta_3$. Accordingly, an upstream portion of the fixing belt 65 in the rotation direction B thereof contacts the upstream slit edge 70*b* of the bearing 70S. Conversely, a downstream portion of the fixing belt 65 in the rotation direction B thereof is isolated from the downstream slit edge 70*b*S of the bearing 70S. The slit edges 70*b* and 70*b*S are oblique relative to the edge face 65*f* of the fixing belt 65. An outboard end 70*b*2 of the slit edge 70*b*S defining an acute angle is situated outboard from the inboard end 70*b*1 in the axial direction D65 of the fixing belt 65. The inboard end 70*b*1 of the slit edge 70*b*S defining an obtuse angle is situated inboard from the outboard end 70*b*2 in the axial direction D65 of the fixing belt 65.

Thus, the bearing 70S deformed as described above to offset the downstream slit edge 70*b*S from the upstream slit edge 70*b*, even if the fixing belt 65 contacts the bearing 70S, prevents breakage of the fixing belt 65. Alternatively, instead of the oblique upstream slit edge 70*b* and the oblique downstream slit edge 70*b*S, the bearing 70S may include the slit edge 70*a* shown in the diagram (b) in FIG. 6 or the slit edge 70*c* shown in the diagram (d) in FIG. 6.

A description is provided of a construction of a bearing 70T according to a third exemplary embodiment.

Figure 11:
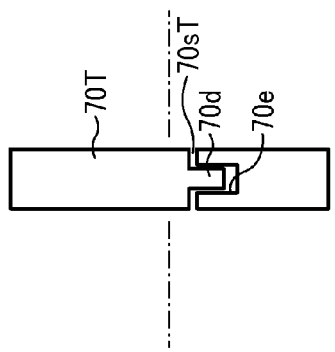
FIG. 11 is a side view of a bearing according to a third exemplary embodiment of the present disclosure.

FIG. 11 is a side view of the bearing 70T that bears the heating roller 62 depicted in FIG. 2. The bearing 70T has a substantially winding slit 70*s*T different from the substantially planar slit 70*s* shown in FIG. 7. For example, the bearing 70T includes a projecting slit edge 70*d* and a recessed slit edge 70*e*. The projecting slit edge 70*d* engages the recessed slit edge 70*e* with a slight interval therebetween. Accordingly, even if the slight interval between the projecting slit edge 70*d* and the recessed slit edge 70*e*, that is, the slit 70*s*T, is enlarged, engagement of the projecting slit edge 70*d* with the recessed slit edge 70*e* is retained, preventing the projecting slit edge 70*d* and the recessed slit edge 70*e* from shifting in the axial direction of the heating roller 62. Additionally, a downstream slit edge, that is, one of the projecting slit edge 70*d* and the recessed slit edge 70*e*, does not come into contact with the fixing belt 65 earlier than an upstream slit edge, that is, another one of the projecting slit edge 70*d* and the recessed slit edge 70*e*, preventing damage to the fixing belt 65. It is preferable that the recessed slit edge 70*e* is disposed upstream from the projecting slit edge 70*d* in the rotation direction D62 of the heating roller 62.

The present disclosure is not limited to the details of the exemplary embodiments described above and various modifications and improvements are possible. For example, according to the exemplary embodiments described above, the bearings 70, 70S, and 70T are applied to the heating roller 62 serving as a belt support or a support roller that supports the fixing belt 65. Alternatively, the bearings 70, 70S, and 70T may be applied to other rollers serving as a belt support or a support roller that supports a belt. For example, the bearings 70, 70S, and 70T may be applied to a fixing roller that supports a fixing belt and a pressure roller that supports a pressure belt. The bearings 70, 70S, and 70T may be installed in a belt device 6V shown in FIG. 7 that includes the driving gear 91, the driven gear 90, the heating roller 62 serving as a support roller, the fixing pad 63 serving as a support, and the fixing belt 65 serving as a belt. The bearings 70, 70S, and 70T may also be installed in the primary transfer device 3 shown in FIG. 1 that includes the intermediate transfer belt 8 looped over a plurality of rollers.

A description is provided of advantages of the fixing devices 6 and 6S.

As shown in FIGS. 2, 3, and 10A, a fixing device (e.g., the fixing devices 6 and 6S) includes a belt (e.g., the fixing belt 65) rotatable in the rotation direction B and looped over a plurality of supports including a support roller (e.g., the heating roller 62) rotatable in the rotation direction D62; a pressure rotator (e.g., the pressure roller 66) rotatable in the rotation direction A and contacting an outer circumferential surface of the belt to form the fixing nip N therebetween; a gear train (e.g., the driver 600) connected to the support roller and the pressure rotator to drive and rotate the support roller and the pressure rotator; and a heater (e.g., the heater 61) to heat the support roller.

As shown in FIGS. 4, 10A, and 11, a pair of bearings (e.g., the bearings 70, 70S, and 70T) rotatably supports the support roller. As a recording medium (e.g., a sheet P) bearing a toner image is conveyed through the fixing nip N, the toner image is fixed on the recording medium. As a lateral edge face of the belt comes into contact with the bearing, the bearing restricts skew of the belt in an axial direction thereof. The bearing is made of an elastic material and includes a slit (e.g., the slits 70*s* and 70*s*T) at a part of the bearing in a circumferential direction thereof. An inner diameter of the bearing is smaller than an outer diameter of a shaft (e.g., the shaft 62*a*) of the support roller disposed at each lateral end of the support roller in an axial direction thereof. The shaft of the support roller is press-fitted into the bearing to allow the bearing to rotatably support the shaft of the support roller.

As shown in FIG. 7, one of the shafts of the support roller mounts a driven gear (e.g., the driven gear 90) that meshes with a driving gear (e.g., the driving gear 91) that transmits a driving force from the gear train to the support roller through the driven gear, thus rotating the support roller. The slit is disposed upstream from the mesh position E where the driven gear meshes with the driving gear in the rotation direction D62 of the support roller. The mesh position E and the slit define the circumferential angle $\theta_2$ not smaller than about 20 degrees.

The inner diameter of the bearing is smaller than the outer diameter of each shaft of the support roller. Each shaft of the support roller is press-fitted into the bearing such that the bearing rotatably supports the shaft of the support roller. Accordingly, without increasing the number of parts and the number of assembly processes, parallelism of the plurality of supports is retained and tilt of the bearing is prevented. Additionally, the belt is immune from being caught in a gap produced between an inner circumferential surface of the bearing and the shaft of the support roller, preventing damage to the belt and extending a life of the belt. Further, the belt is driven stably, saving energy consumed by the fixing device. The slit of the bearing is isolated from the mesh position E where the driven gear meshes with the driving gear in the rotation direction D62 of the support roller such that the mesh position E and the slit define the circumferential angle $\theta_2$ not smaller than about 20 degrees, thus preventing the slit from being enlarged by a drawing rotation force generated by the driving gear and thereby attaining stable support of the support roller by the bearing.

According to the exemplary embodiments described above, the fixing belt 65 serves as a belt or a fixing belt. Alternatively, a fixing film, a fixing sleeve, or the like may be used as a belt or a fixing belt. Further, the pressure roller 66 serves as a pressure rotator. Alternatively, a pressure belt or the like may be used as a pressure rotator.

The present disclosure has been described above with reference to specific exemplary embodiments. Note that the present disclosure is not limited to the details of the embodiments described above, but various modifications and enhancements are possible without departing from the spirit and scope of the disclosure. It is therefore to be understood that the present disclosure may be practiced otherwise than as specifically described herein. For example, elements and/or features of different illustrative exemplary embodiments may be combined with each other and/or substituted for each other within the scope of the present disclosure.

What is claimed is:

1. A belt device comprising:
    a belt;
    a support supporting the belt;
    a support roller rotatable in a predetermined direction of rotation and supporting the belt, the support roller including a plurality of shafts disposed at both lateral ends of the support roller in an axial direction thereof, respectively;
    a driven gear mounted on one of the plurality of shafts of the support roller;
    a driving gear meshing with the driven gear at a mesh position to transmit a driving force to the support roller through the driven gear to rotate the support roller; and
    an elastic bearing rotatably bearing each of the plurality of shafts of the support roller and having an inner diameter smaller than an outer diameter of the shaft of the support roller,
    the bearing including a slit defining a part of the bearing in a circumferential direction thereof, the slit being disposed upstream from the mesh position in the direction of rotation of the support roller such that the mesh position and the slit define a circumferential angle not smaller than about 20 degrees.

2. The belt device according to claim 1, wherein the inner diameter of the bearing is smaller than the outer diameter of the shaft of the support roller by a range of from about 0.01 mm to about 0.05 mm.

3. The belt device according to claim 1,
    wherein the bearing includes an inboard face disposed opposite the belt, and
    wherein the belt includes an edge face to come into contact with the inboard face of the bearing.

4. The belt device according to claim 3, wherein at least one of the inboard face of the bearing and the edge face of the belt is made of a material that facilitates separation between the bearing and the belt.

5. The belt device according to claim 3, wherein at least one of the inboard face of the bearing and the edge face of the belt is coated with a material that facilitates separation between the bearing and the belt.

6. The belt device according to claim 1, wherein the bearing further includes:
    an upstream slit edge to contact the belt; and
    a downstream slit edge disposed opposite the upstream slit edge to define the slit between the upstream slit edge and the downstream slit edge, the downstream slit edge being disposed downstream from the upstream slit edge in the direction of rotation of the support roller.

7. The belt device according to claim 6, wherein the downstream slit edge is offset from the upstream slit edge in the axial direction of the support roller and isolated from the belt.

8. The belt device according to claim 7,
    wherein the belt includes an edge face disposed opposite the bearing, and
    wherein the upstream slit edge and the downstream slit edge are oblique relative to the edge face of the belt.

9. The belt device according to claim 8, wherein the downstream slit edge includes:
    an outboard end defining an acute angle; and
    an inboard end defining an obtuse angle and disposed inboard from the outboard end in the axial direction of the support roller.

10. The belt device according to claim 6, wherein the upstream slit edge and the downstream slit edge are parallel to a diametrical direction of the support roller.

11. The belt device according to claim 6, wherein the upstream slit edge overlaps the downstream slit edge in the circumferential direction of the bearing.

12. The belt device according to claim 1, wherein the bearing further includes:
    a projecting slit edge; and
    a recessed slit edge to engage the projecting slit edge with a slight interval therebetween to define the slit between the projecting slit edge and the recessed slit edge.

13. The belt device according to claim 1, further comprising a frame,
    wherein the bearing further includes a detent contacting the frame.

14. The belt device according to claim 1, wherein the shaft of the support roller is press-fitted into the bearing.

15. The belt device according to claim 1, wherein the bearing is substantially C-shaped.

16. A fixing device comprising:
    a belt;
    a heater disposed opposite the belt to heat the belt;
    a pressure rotator to contact the belt to form a fixing nip therebetween, through which a recording medium bearing a toner image is conveyed;
    a support supporting the belt;
    a support roller rotatable in a predetermined direction of rotation and supporting the belt, the support roller including a plurality of shafts disposed at both lateral ends of the support roller in an axial direction thereof, respectively;
    a gear train connected to the pressure rotator and the support roller to drive the pressure rotator and the support roller,
    the gear train including:
        a driven gear mounted on one of the plurality of shafts of the support roller; and
        a driving gear meshing with the driven gear at a mesh position to transmit a driving force to the support roller through the driven gear to rotate the support roller; and
    an elastic bearing rotatably bearing each of the plurality of shafts of the support roller and having an inner diameter smaller than an outer diameter of the shaft of the support roller,
    the bearing including a slit defining a part of the bearing in a circumferential direction thereof, the slit being disposed upstream from the mesh position in the direction of rotation of the support roller such that the mesh position and the slit define a circumferential angle not smaller than about 20 degrees.

17. The fixing device according to claim 16, wherein the toner image is made of toner containing oily silica as an additive.

18. The fixing device according to claim 16, wherein the support includes a fixing pad.

19. The fixing device according to claim 16, wherein the pressure rotator includes a pressure roller.

20. An image forming apparatus comprising:
an image forming device to form a toner image; and
a fixing device disposed downstream from the image forming device in a recording medium conveyance direction to fix the toner image on a recording medium,
the fixing device including:
- a belt;
- a heater disposed opposite the belt to heat the belt;
- a pressure rotator to contact the belt to form a fixing nip therebetween, through which the recording medium bearing the toner image is conveyed;
- a support supporting the belt;
- a support roller rotatable in a predetermined direction of rotation and supporting the belt, the support roller including a plurality of shafts disposed at both lateral ends of the support roller in an axial direction thereof, respectively;
- a gear train connected to the pressure rotator and the support roller to drive the pressure rotator and the support roller,
the gear train including:
  - a driven gear mounted on one of the plurality of shafts of the support roller; and
  - a driving gear meshing with the driven gear at a mesh position to transmit a driving force to the support roller through the driven gear to rotate the support roller; and
- an elastic bearing rotatably bearing each of the plurality of shafts of the support roller and having an inner diameter smaller than an outer diameter of the shaft of the support roller,
the bearing including a slit defining a part of the bearing in a circumferential direction thereof, the slit being disposed upstream from the mesh position in the direction of rotation of the support roller such that the mesh position and the slit define a circumferential angle not smaller than about 20 degrees.

* * * * *